(12) United States Patent
Nam

(10) Patent No.: US 8,482,584 B2
(45) Date of Patent: Jul. 9, 2013

(54) THREE DIMENSIONAL IMAGE DISPLAY APPARATUS

(75) Inventor: Yun-woo Nam, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 13/166,504

(22) Filed: Jun. 22, 2011

(65) Prior Publication Data
US 2011/0316898 A1 Dec. 29, 2011

(30) Foreign Application Priority Data

Jun. 23, 2010 (KR) ........................ 10-2010-0059699

(51) Int. Cl.
G09G 5/10 (2006.01)
(52) U.S. Cl.
USPC ............... 345/690; 345/6; 345/204; 345/697; 348/51; 359/462
(58) Field of Classification Search
USPC ........ 345/6, 102, 204, 419, 690, 697; 348/40, 348/42, 51, 54; 359/15, 28, 462, 466
See application file for complete search history.

(56) References Cited

U.S. PATENT DOCUMENTS 6,483,533 B1   11/2002  Hall, Jr. et al.
7,607,780 B2   10/2009  Kim et al.
7,626,644 B2*  12/2009  Shestak et al. ................ 349/15
8,279,163 B2*  10/2012  Kim et al. ..................... 345/102
8,279,221 B2*  10/2012  Song et al. .................... 345/427
8,339,695 B2*  12/2012  Haussler et al. ............... 359/28
8,373,684 B2*   2/2013  Kim et al. ..................... 345/204
2005/0168815 A1* 8/2005 Maruyama et al. ........... 359/465
2005/0264882 A1* 12/2005 Daiku ........................... 359/465
2007/0133076 A1*  6/2007 Endo et al. ..................... 359/15
2007/0171525 A1*  7/2007 Miller et al. ................... 359/467
2009/0097007 A1*  4/2009 Tanaka ........................... 355/67
2009/0141324 A1*  6/2009 Mukawa ........................ 359/13
2010/0177113 A1*  7/2010 Gay et al. ...................... 345/589

FOREIGN PATENT DOCUMENTS

JP   09-107564       4/1997
JP   2009-145829     7/2009
KR   10-2000-0030846 6/2000
KR   10-2004-0066570 7/2004
KR   10-2006-0078465 7/2006

* cited by examiner

Primary Examiner — Joe H Cheng
(74) Attorney, Agent, or Firm — NSIP Law

(57) ABSTRACT

A 3-D image display including an image forming unit for forming an image by modulating light according to image information is provided. The 3-D image display includes a display device with a plurality of first regions for forming a left eye image and a plurality of second regions for forming a right eye image in a 3-D image mode. The 3-D image display also includes a viewpoint controller with first and second reflection mirror devices for reflecting light of a left eye image and light of a right eye image input from the image forming unit to first and second viewpoints when displaying a 3-D image. The locations of the first and second viewpoints may be changed by controlling an angle of reflection surfaces of the first and second reflection mirror devices.

24 Claims, 19 Drawing Sheets

THREE DIMENSIONAL IMAGE DISPLAY APPARATUS

CROSS-REFERENCE TO RELATED APPLICATIONS

This application claims the benefit of Korean Patent Application No. 10-2010-0059699, filed on Jun. 23, 2010, in the Korean Intellectual Property Office, the disclosure of which is incorporated herein in its entirety by reference for all purposes.

BACKGROUND

1. Field

The following description relates to a three dimensional (3-D) image display apparatus, and more particularly, to a 3-D image display apparatus with an expanded viewing zone.

2. Description of the Related Art

Three dimensional (3-D) image display apparatuses are widely used in a variety of fields such as medical imaging, games, advertisements, education, and military applications. For displaying a 3-D image, methods such as a holography method or a stereoscopy method have been studied. Although the holography method is an exceptional 3-D image display method, the holography method generally requires a coherent light source and presents difficulties in recording and reproducing a large object located at a far distance.

The stereoscopy method generates a sense of depth by providing two separate two-dimensional (2-D) images having binocular parallax to both eyes of a viewer. Thus method using two plane images may be relatively simply implemented. The stereoscopy method may be implemented by methods such as a glasses type method including an auxiliary unit for seeing separated images for both eyes, or an autostereoscopy method of forming a viewing zone by directly separating an image formed by a display. The autostereoscopy method is generally preferred to the glasses type method, which is inconvenient simply because glasses are required. The autostereoscopy method is typically implemented with a parallax barrier method or a lenticular lens method.

The stereoscopy method may be implemented in a system by an arrangement of only optical components. However, since left and right images are formed at one screen, resolution may be reduced by half or more when compared to viewing a 2-D image on the screen. Also, since a viewing zone is limited according to a viewpoint, it may be inconvenient for a viewer to fix their position to the viewpoint when viewing a 3-D image. For example, when an image with only two viewpoints is provided, a range for a viewer to observe the 3-D image is very limited. If the viewer moves his or her head, left and right images may be reversed; thus, the viewer may be inconvenienced when watching a 3-D image. In addition, when the number of viewpoints is increased in order to expand the viewing zone, resolution may be reduced accordingly.

SUMMARY

Provided is a 3-D image display apparatus with an expanded viewing zone, while substantially maintaining resolution when 3-D images are realized in an autostereoscopic manner.

Additional aspects will be set forth in part in the description which follows and, in part, will be apparent from the description, or may be learned by practice of the presented examples.

According to one general aspect, a 3-D image display apparatus includes an image forming unit including a display device with a plurality of first regions for forming a first image and a plurality of second regions for forming a second image, and a viewpoint controller including first and second reflection mirror devices for reflecting light of the first image to a first viewpoint and light of the second image to a second viewpoint, and for changing locations of the first and second viewpoints by controlling an angle of reflection surfaces of the first and second reflection mirror devices, wherein the first image and the second image are formed according to image information.

To separate the light of the first image and the light of the second image formed by the display device and to collect the separated first and second lights at the first and second viewpoints in a 3-D image mode, the number of the first reflection mirror devices may correspond to the number of the first regions, and the angle of each reflection surface of the first reflection mirror devices may be set to reflect the light of the first image from the first regions to collect the light of the first image at the first viewpoint, the number of the second reflection mirror devices may correspond to the number of the second regions, and the angle of each reflection surface of the first reflection mirror devices may be set to reflect the light of the second image from the second regions to collect the light of the second image at the second viewpoint, and the angles of the reflection surfaces of the first and second reflection mirror devices may be controlled to change the locations of the first and second viewpoints at least twice so that a 3-D image is formed at a plurality of viewpoints.

The reflection surfaces of the first and second reflection mirror devices may be controllable to switch between a 2-D image mode and the 3-D image mode, and in the 2-D image mode the reflection surfaces of the first and second reflection mirror devices may be fixed at substantially the same angle.

At least two of each of the first and second reflection mirror devices may be controlled to have different angles.

When the locations of the first and second viewpoints are changed to any of other locations, the angle of each of the reflection surfaces of the first and second reflection mirror devices may be changed by substantially the same degree.

The image forming unit may further include a lens array unit for separating the light of the first image and the light of the second image and for collecting the separated first and second lights at the first and second viewpoints in a 3-D image mode. The first and second reflection mirror devices may reflect the light of the first image and the light of the second image, separated by the lens array unit, toward the first and second viewpoints in the 3-D image mode. The locations of the first and second viewpoints may be changed at least twice by controlling the angle of each of the reflection surfaces of the first and second reflection mirror devices, to form a 3-D image at a plurality of viewpoints.

Each of the first and second reflection mirror devices may include a single reflection mirror device or a plurality of reflection mirror devices in a 2-D array, and when the locations of the first and second viewpoints are changed to any of other locations, the angle of each of the reflection surfaces of the first and second reflection mirror devices may be changed by substantially the same degree.

The lens array unit may be an active type lens array unit that separates the first image and the second image in the 3-D image mode, but does not operate as a lens in a 2-D mode, and is controllable to switch between the 2-D image mode and the 3-D image modes.

The first and second reflection mirror devices each may control the angles of the reflection surfaces in an analog manner.

The first regions for forming the first image and the second regions for forming the second image may be alternately arranged, and the first and second reflection mirror devices may be alternately arranged to correspond to the first and second regions.

The first regions may be located at one side of the display device, the second regions may be located at another side of the display device, and the first and second reflection mirror devices may be arranged to correspond to the first and second regions.

The first and second reflection mirror devices each may control the angles of the reflection surfaces in an analog manner.

The image forming unit may include a surface light source, and the display device of the image forming unit may be a flat type display device that modulates light emitted by the surface light source according to the image information.

The display device may include a reflection mirror type display panel.

The reflection mirror type display panel may form the first image and the second image by changing an angle of a reflection surface of a reflection mirror corresponding to the first and second regions.

The reflection type display panel may include a first reflection mirror type display panel that includes the first regions and a second reflection mirror type display panel that includes the second regions, in which the second reflection mirror type display panel is separated from the first reflection mirror type display panel. The first reflection mirror device may reflect the light of the first image incident thereon from the first reflection mirror type display panel, to collect the light of the first image at the first viewpoint. The second reflection mirror device may reflect the light of the second image incident thereon from the second reflection mirror type display panel, to collect the light of the second image at the second viewpoint.

The reflection mirror type display panel may be a single panel that includes the first and second regions to emit the light of the first image and the light of the second image to proceed toward the first and second reflection mirror devices, wherein the light of the first image and the light of the second image are separated from each other. The first reflection mirror device may reflect the light of the first image from the reflection mirror type display panel to collect the light of the first image at the first viewpoint. The second reflection mirror device may reflect the light of the second image from the reflection mirror type display panel to collect the light of the second image at the second viewpoint.

The reflection mirror type display panel may be a single panel in which the first and second regions are alternately arranged to emit the light of the first image and the light of the second image toward the first and second reflection mirror devices. The first and second reflection devices may be single panels that are alternately arranged, such that each of the single panels of the first and second reflection devices corresponds to one of the single panels of the reflection mirror type display panel. The first reflection mirror device may reflect the light of the first image from the reflection mirror type display panel to collect the light of the first image at the first viewpoint. The second reflection mirror device may reflect the light of the second image from the reflection mirror type display panel to collect the light of the second image at the second viewpoint.

The display device may include a reflection mirror type display panel. The reflection mirror type display panel may form the first image and the second image by changing an angle of a reflection surface of a reflection mirror corresponding to the first and second regions. The first and second reflection mirror devices may be separated from each other. The reflection mirror type display panel may be a single panel in which the first and second regions are alternately arranged, or may have a structure in which a panel that includes the first regions is separated from a panel that includes the second regions, and emits the light of the first image and the light of the second image toward the first and second reflection mirror devices. A first lens for collecting the light of the first image may be disposed between the reflection mirror type display panel and the first reflection mirror device. A second lens for collecting the light of the second image may be disposed between the reflection mirror type display panel and the second reflection mirror device. The first reflection mirror device may reflect the light of the first image collected by the first lens toward the first viewpoint. The second reflection mirror device may reflect the light of the second image collected by the second lens toward the second viewpoint. The first and second reflection mirror devices may change the locations of the first and second viewpoints at least twice by controlling the angle of reflection surfaces of the first and second reflection mirror devices, to form a 3-D image at a plurality of viewports.

In another general aspect, a method of displaying a 3-D image or a 2-D image includes forming a first image and a second image according to image information, emitting light of the first image to one or more first reflecting devices, emitting light of the second image to one or more second reflecting devices, reflecting the light of the first image in a first emission direction, and reflecting the light of the second image in a second emission direction, wherein the first emission direction and the second emission direction are selectively controlled to provide a 3-D image or a 2-D image for at least one user.

The 3-D image may be provided when the first image emission direction is directed to a first left eye location of the at least one user and the second image emission direction is directed to a first right eye location of the at least one user.

Another 3-D image may be provided when the first image emission direction is directed to a second left eye location of another at least one user and the second image emission direction is directed to a second right eye location of the another at least one user.

The 2-D image may be provided when the first emission direction is substantially parallel to the second image direction.

Other features and aspects may be apparent from the following detailed description, the drawings, and the claims.

Figure 1A:
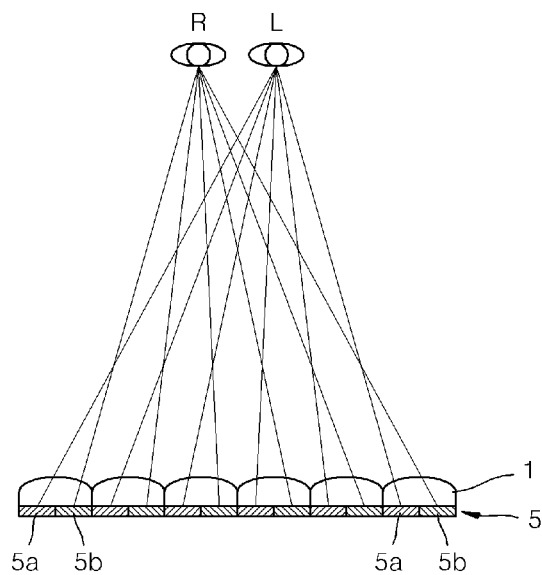
FIGS. 1A and 1B are diagrams illustrating an example of a relationship between the number of viewpoints and a resolution of a display.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1B:
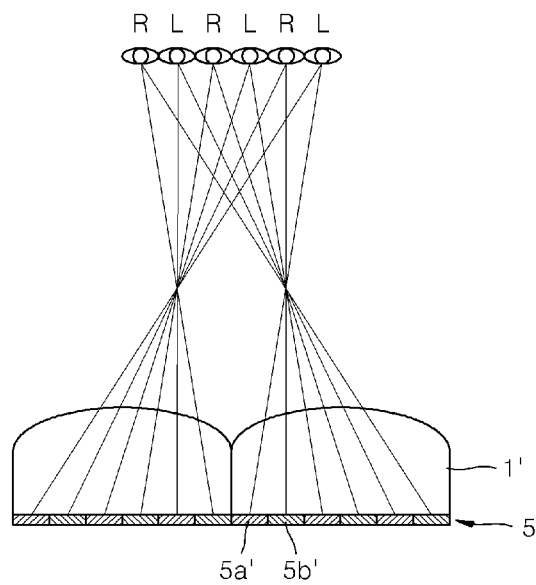

FIGS. 1A and 1B illustrate a relationship between the number of viewpoints and a resolution of a display. In particular, FIG. 1A illustrates displaying a 3-D image with two viewpoints, and FIG. 1B illustrates displaying a 3-D image with six viewpoints.

Referring to FIG. 1A, two viewports are illustrated, for example, one viewport for a viewer's right eye and one viewport for a viewer's left eye. In order to display a 3-D image with two viewpoints by separating an image, a lens (for example, a lenticular lens) may be used as an image separation unit. The image separation unit may be arranged in such a way that each of lens units 1 correspond to a pixel 5a for forming a left eye image and a pixel 5b for forming a right eye image. Accordingly, an image formed by a display device 5 may be focused into a left eye image L and a right eye image R. However, according to this example, when a 3-D image with two viewpoints is formed, resolution is reduced by half as compared to when a 2-D image is formed.

Referring to FIG. 1B, a lens (for example, a lenticular lens) may be used as the image separation unit. The image separation unit may be arranged in such a way that each of lens units 1' correspond to three pixels 5a', each for forming a left eye image, and three pixels 5b', each for forming a right eye image. Accordingly, an image formed by the display device 5 may be focused into three left eye images L and three right eye images R of six viewpoints. That is, three pairs of the left eye image L and the right eye image R may be formed at different locations.

When a 3-D image is formed with six viewpoints according to the example illustrated in FIG. 1B, a viewing zone may be increased, but resolution is reduced by a third compared to when a 3-D image is formed with two viewpoints.

As described above, according to a general 3-D image display principle, since a viewing zone is limited according to the number of viewpoints, an issue arises when considering a viewer's position during viewing. Also, although the number of viewpoints may be increased to expand the viewing zone, resolution may be reduced accordingly.

Figure 2:
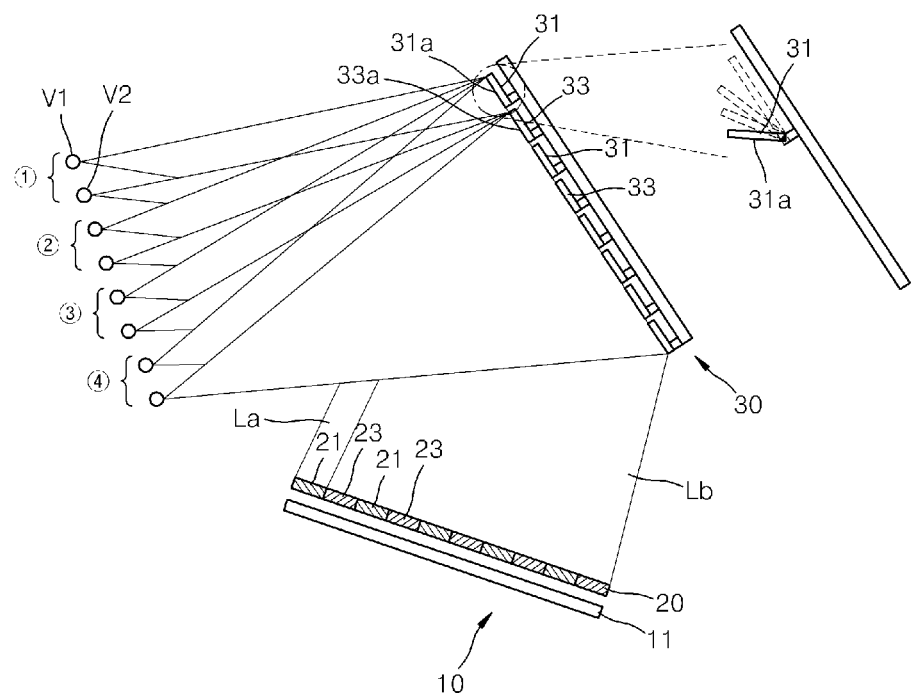
FIG. 2 is a diagram illustrating an example of a 3-D image display apparatus that can expand a viewing zone while substantially maintaining a display resolution.

FIG. 2 illustrates an example of a 3-D image display apparatus that can expand a viewing zone while substantially maintaining a display resolution. The 3-D image display apparatus the example illustrated in FIG. 2 can switch between forming a 2-D image and forming a 3-D image according to operation of a viewpoint controller 30.

Referring to FIG. 2, the 3-D image display apparatus includes an image forming unit 10 and the viewpoint controller 30. The image forming unit 10 includes a display device 20, and may form a left eye image and a right eye image in a 3-D image mode. The viewpoint controller 30 may reflect light La of a left eye image and light Lb of a right eye image output from the image forming unit 10 toward first and second viewpoints V1 and V2, and may change the locations of the first and second viewpoints V1 and V2. The display device 20 may form an image by modulating light according to image information. The display device 20 includes a plurality of first regions 21 for forming a left eye image in the 3-D image mode and a plurality of second regions 23 for forming a right eye image in the 3-D image mode. The viewpoint controller 30 includes first and second reflection mirror devices 31 and 33 that may respectively reflect the light La of a left eye image and the light Lb of a right eye image toward the first and second viewpoints V1 and V2, by controlling reflection angles thereof. Accordingly, the viewpoint controller 30 may change the locations of the first and second viewpoints V1 and V2 by controlling a tilt angle of each of reflection surfaces of the first and second reflection mirror devices 31 and 33 during 3-D image displaying.

The image forming unit 10 may include, for example, a surface light source 11. The display device 20, which may be a transmission-type device, may include a flat type display device for forming an image by modulating light emitted by the surface light source 11 according to image information. The surface light source 11 may emit collimated light to the display device 20.

The display device 20 may include a 2-D pixel array, in which each of the first and second regions 21 and 23 may indicate a pixel unit or a pixel array arranged in a vertical or horizontal line. The regions may be arranged such that the first regions 21 and the second regions 23 alternate.

Figure 3:
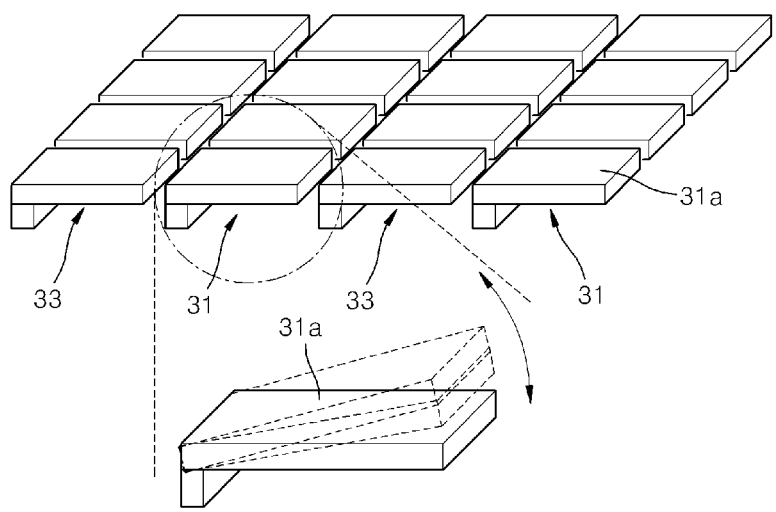
FIG. 3 is a diagram illustrating an example of a portion of a reflection mirror device array of a viewpoint controller of FIG. 2.

The viewpoint controller 30 may include a reflection mirror device array arranged in a two-dimensional manner to correspond to the 2-D pixel array of the display device 20, as illustrated in FIG. 3. FIG. 3 illustrates an example of a portion of the reflection mirror device array of the viewpoint controller 30 of FIG. 2. When each of the first and second regions 21 and 23 represents a pixel array arranged in a vertical or horizontal line, each of the first and second reflection mirror devices 31 and 33 may include a reflection mirror device array corresponding to one of the pixel arrays. The first reflection mirror devices 31 and the second reflection mirror devices 33 may be arranged in an alternating manner to correspond to the arrangement of the first regions 21 and the second regions 23.

In one example, the viewpoint controller 30 may separate a left eye image and a right eye image formed by the display device 20 in the 3-D image mode to collect the separated images respectively at the first and second viewpoints V1 and V2. Also, the viewpoint controller 30 may control the tilt angle of each of the reflection surfaces of the first and second reflection mirror devices 31 and 33 to change the locations of the first and second viewpoints V1 and V2 in at least two different positions, thereby forming a multi-viewpoint 3-D image in a timesharing manner. Accordingly, each of the first and second reflection mirror devices 31 and 33 may be operated to linearly change a tilt angle of each of a plurality of reflection surfaces 31a and 33a, as illustrated in the enlarged portion of FIG. 3.

The first reflection mirror devices 31 may be arranged to correspond to the first regions 21. The tilt angle of each of the reflection surfaces 31a may be set to collect the light La of a left eye image from the first regions 21 at the first viewpoint V1 by reflecting the light La of a left eye image toward the first viewpoint V1. The second reflection mirror devices 33 may be arranged to correspond to the second regions 23. The tilt angle of each of the reflection surfaces 33a may be set to collect the light Lb of a right eye image from the second regions 23 at the second viewpoint V2 by reflecting the light Lb of a right eye image toward the second viewpoint V2.

Figure 4A:
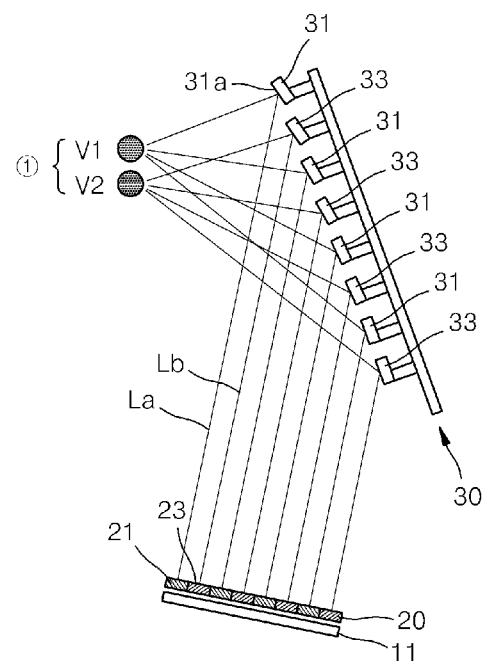
FIGS. 4A-4C are diagrams illustrating an example of a process of forming a multi-viewpoint 3-D image by a time-sharing operation with respect to the viewpoint controller of FIG. 2.
Figure 4B:
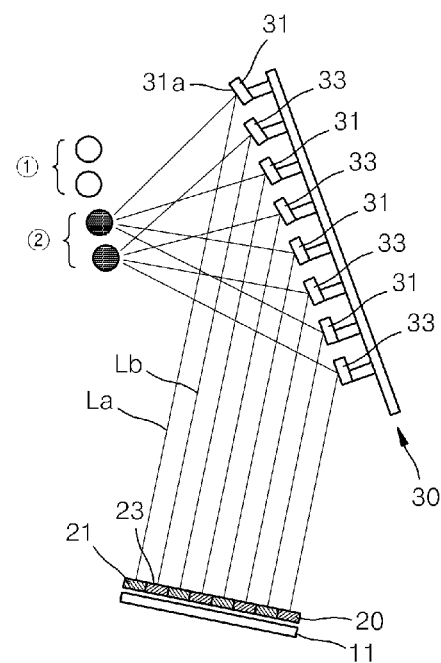
Figure 4C:
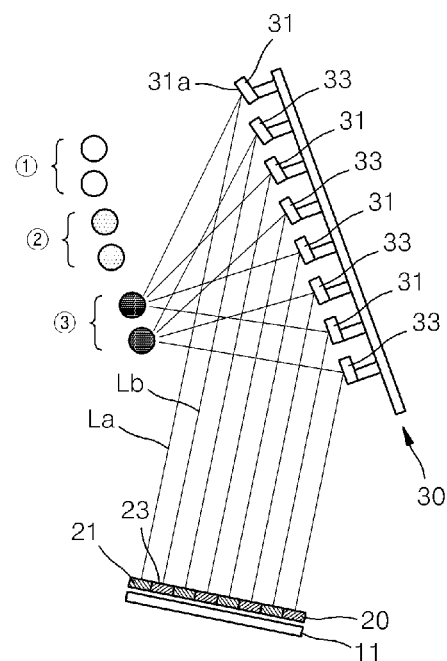

FIGS. 4A-4C illustrate an example of a process of forming a multi-viewpoint 3-D image by a timesharing operation with respect to the viewpoint controller 30. Referring to FIGS. 4A-4C, the tilt angle of each of the reflection surfaces 31a of the first reflection mirror devices 31 may be set to reflect the light La of a left eye image toward the first viewpoint V1, and the tilt angle of each of the reflection surfaces 33a of the second reflection mirror devices 33 may be set to reflect the light Lb of a right eye image toward the second viewpoint V2.

At least two of the reflection surfaces 31a of the first reflection mirror devices 31 may have different tilt angles such that the light La of a left eye image emitted from the first regions 21 and reflected by the reflection surfaces 31a of the first reflection mirror devices 31 is directed to the first viewpoint V1. Also, at least two of the reflection surfaces 33a of the second reflection mirror devices 33 may have different tilt angles such that the light Lb of the right eye image emitted from the second regions 23 and reflected by the reflection surfaces 33a of the second reflection mirror devices 33 is directed to the second viewpoint V2.

When the tilt angle of each of the reflection surfaces 31a and 33a of the first and second reflection mirror devices 31 and 33 are changed by substantially the same degree, as may be observed in the viewpoint location changes of FIGS. 4A-4C, the locations of the first and second viewpoints V1 and V2 may be changed.

The locations of the first and second viewpoints V1 and V2 may be changed from a first location ① of FIG. 4A to a second location ② of FIG. 4B by altering the tilt angle of each of the reflection surfaces 31a and 33a of the first and second reflection mirror devices 31 and 33 by substantially the same degree. Further, the locations of the first and second viewpoints V1 and V2 may be changed from the second location ② of FIG. 4B to a third location ③ of FIG. 4C by changing the tilt angle of each of the reflection surfaces 31a and 33a of the first and second reflection mirror devices 31 and 33 by substantially the same degree.

As described above, if the tilt angle of each of the reflection surfaces 31a of the first reflection mirror devices 31 is set to reflect the light La of a left eye image toward the first viewpoint V1 and the tilt angle of each of the reflection surfaces 33a of the second reflection mirror devices 33 is set to reflect the light Lb of a right eye image toward the second viewpoint V2, the locations of the first and second viewpoints V1 and V2 may be changed from the first location ① to the second or third location ② or ③, or to any of other locations, by controlling the tilt angle of each of the reflection surfaces 31a and 33a. That is, the locations of the first and second viewpoints V1 and V2 may be changed by controlling the tilt angle of each of the reflection surfaces 31a and 33a in timesharing manner.

Thus, a multi-viewpoint 3-D image may be formed in a timesharing manner. Since the multi-viewpoint 3-D image is formed by timesharing and thus only one left eye image and one right eye image, corresponding to one 3-D image with two viewpoints, is formed at any given point in time, even if the number of viewpoints is greatly increased beyond two viewpoints, a resolution when a 3-D image is formed may be maintained at a constant value of half the resolution when a 2-D image is formed, regardless of the number of viewpoints.

Accordingly, since the number of viewpoints may be increased in a timesharing manner as desired, without reduction a resolution of the 3-D image, a viewing zone may be expanded while maintaining a substantially constant 3-D image resolution.

Also, in order to facilitate formation of a multi-viewpoint 3-D image by timesharing when the locations of the first and second viewpoints V1 and V2 are changed in at least two different positions, as described above, the first and second reflection mirror devices 31 and 33 may be formed to control the tilt angles of the reflection surfaces 31a and 33a in an analog manner.

Figure 5A:
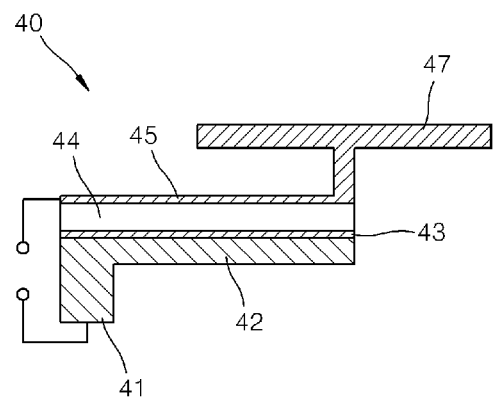
FIGS. 5A and 5B are diagrams illustrating an example of a structure and an operational state of an analog mirror device in which a tilt angle of a reflection surface varies according to an applied voltage.
Figure 5B:
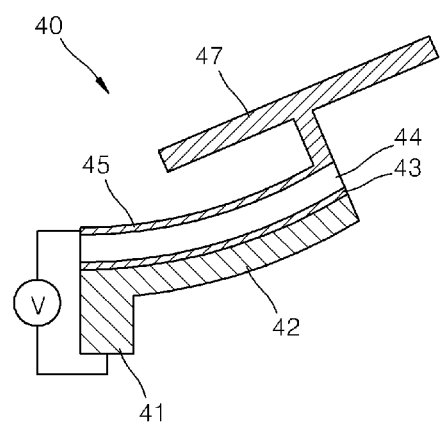

As an example illustrated in FIGS. 5A and 5B, an analog mirror device 40 in which a tilt angle of a reflection surface is changed according to an applied voltage, or an array thereof, may be implemented as each of the first and second reflection mirror devices 31 and 33.

Referring to FIGS. 5A and 5B, the analog mirror device 40 may include, for example, a support layer 42 extending from an upper end of a fixed portion 41 in a lateral direction, a bottom electrode 43 formed on the support layer 42, a piezoelectric material layer 44, an upper electrode 45, and a reflection mirror 47 formed on the upper electrode 45.

According to the analog mirror device 40, a tilt angle θ of the reflection mirror 47 varies according to an amount of voltage applied between the bottom electrode 43 and the upper electrode 45. The viewpoint controller 30 may include a 2-D array of the analog mirror devices 40 as illustrated in FIGS. 5A and 5B, corresponding to the 2D pixel array of the display device 20.

Figure 6:
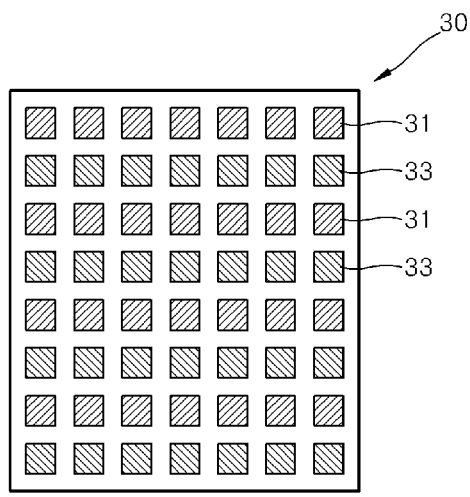
FIG. 6 is a diagram illustrating an example of 2-D array of reflection mirror devices that may be applied to the viewpoint controller of FIG. 2.

As illustrated in FIG. 2, the first regions 21 forming a left eye image and the second regions 23 forming a right eye image may be alternately arranged in the display device 20, and the first and second reflection mirror devices 31 and 33 may be alternately arranged to correspond to the first and second regions 21 and 23. As one example, the viewpoint controller 30 may have a 2-D array of reflection mirror devices as illustrated in FIG. 6. For example, each row may be either formed of the first reflection mirror devices 31 or formed of the second reflection mirror devices 33.

In a 3-D image display apparatus implemented with reference to the examples described in FIGS. 2-6, the display may switch between a 2-D image mode and the 3-D image mode. In the 2-D image mode, when the image forming unit 10 is to form a 2-D image, the reflection surfaces 31a and 33a of the first and second reflection mirror devices 31 and 33 are fixed at substantially the same tilt angle.

Figure 7:
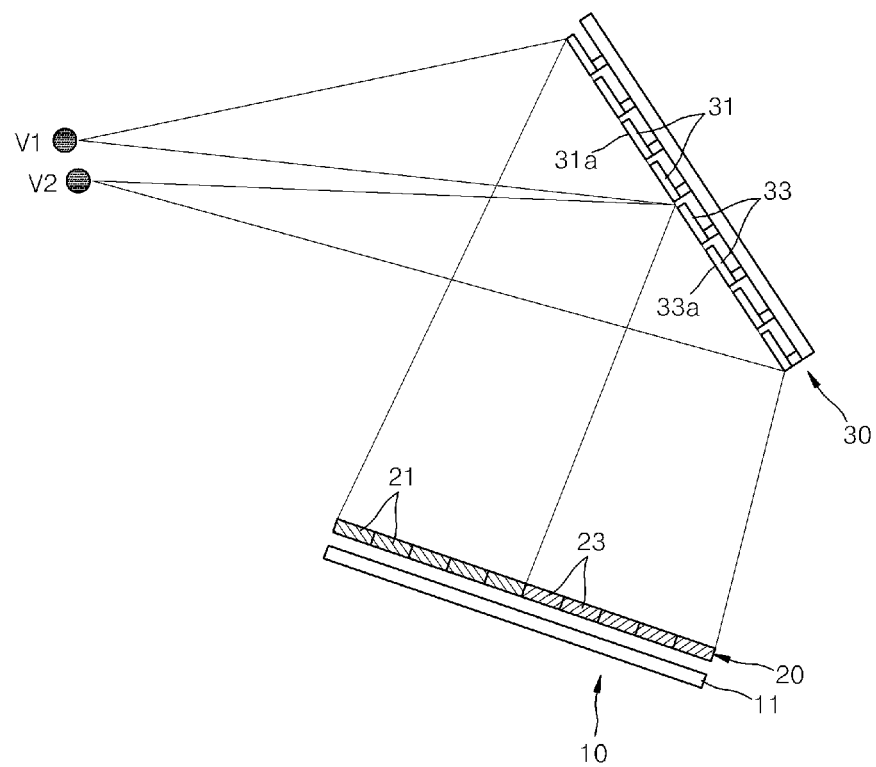
FIG. 7 is a diagram illustrating another example of a 3-D image display apparatus.

FIG. 7 illustrates another example of a 3-D image display apparatus. In the 3-D image display apparatus of FIG. 7, the first regions 21 are located at one side of the display device 20, whereas the second regions 23 are located at another side of the display device 20. Accordingly, the first reflection mirror devices 31 are located at a first side of the viewpoint controller 30 that corresponds to the first regions 21, whereas the second reflection mirror devices 33 are located at a second side of the viewpoint controller 30 that corresponds to the second regions 23.

As illustrated in FIG. 7, in a 3-D image mode, approximately half of the display device 20 is used as the first regions 21 to form a left eye image, whereas approximately the other half of the display device 20 is used as the second regions 23 to form a right eye image. The viewpoint controller 30 may control a left eye image and a right eye image formed by the display device 20 to be respectively collected at the first viewpoint V1 and the second viewpoint V2. In a 2-D image display mode, as similarly illustrated in FIG. 2, when the image forming unit 10 is to form a 2-D image, the reflection surfaces 31a and 33a of the first and second reflection mirror devices 31a and 33a are fixed at substantially the same tilt angle.

Figure 8:
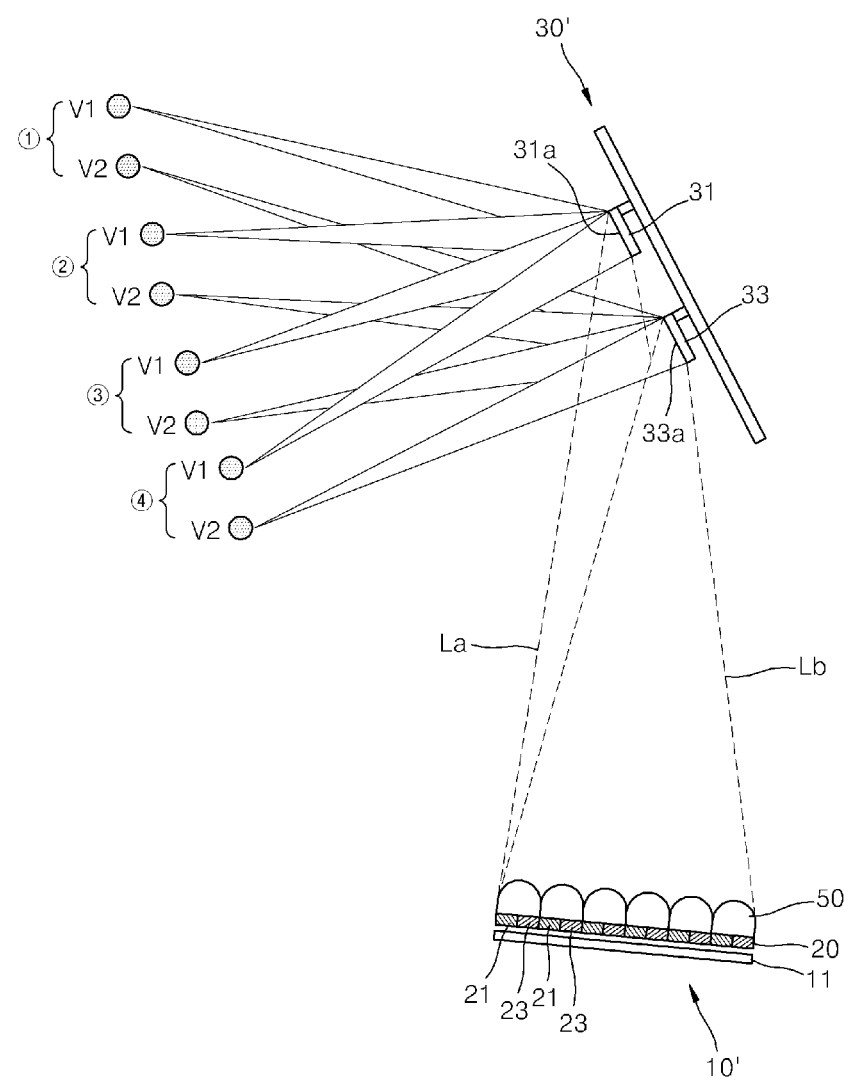
FIG. 8 is a diagram illustrating another example a 3-D image display apparatus that can expand a viewing zone while substantially maintaining a display resolution.

FIG. 8 is a diagram illustrating another example of a 3-D image display apparatus that can expand a viewing zone while substantially maintaining a display resolution. As compared with FIG. 2, an image forming unit 10' of FIG. 8 further includes a lens array unit 50 that may separate a left eye image and a right eye image respectively formed by the first and second regions 21 and 23 of the display device 20 in a 3-D image mode. The lens array unit 50 may collect the left eye image and the right eye image respectively at the first and second viewpoints V1 and V2. Further in the example of FIG. 8, the first and second reflection mirror devices 31 and 33 of a viewpoint controller 30' may respectively reflect the light La of a left eye image and the light Lb of a right eye image, separated by the lens array unit 50, toward the first and second viewpoints V1 and V2 in the 3-D image mode.

In FIG. 8, each of the first and second reflection mirror devices 31 and 33 may include a single reflection mirror device or a plurality of reflection mirror devices in a 2-D array. FIG. 8 illustrates an example in which each of the first and second reflection mirror devices 31 and 33 has a single reflection mirror device. Further, each of the first and second reflection mirror devices 31 and 33 may have a plurality of reflection mirror devices in a 2-D array, an example of which is illustrated in FIG. 6.

Figure 9A:
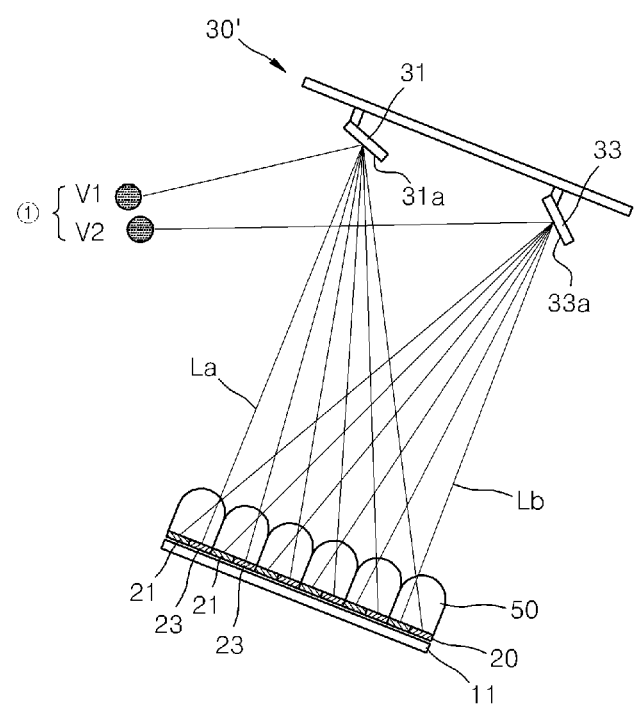
FIGS. 9A and 9B are diagrams illustrating an example of a process of forming a multi-viewpoint 3-D image by a time-sharing operation with respect to the viewpoint controller of FIG. 8.
Figure 9B:
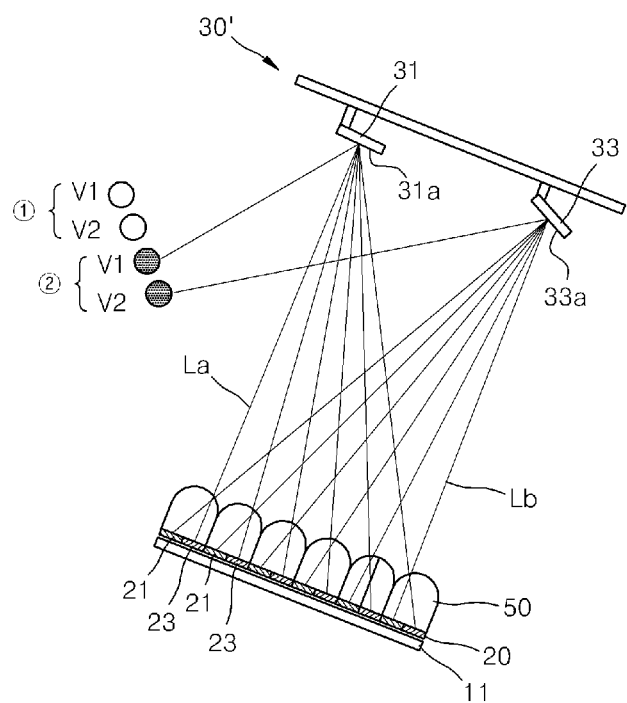

By altering the tilt angle of each of the reflection surfaces 31a and 33a of the first and second reflection mirror devices 31 and 33 to substantially the same degree, as is illustrated in an example of a change in the viewpoint locations between FIGS. 9A and 9B, the locations of the first and second viewpoints V1 and V2 may be changed. FIGS. 9A and 9B illustrate an example of a process of forming a multi-viewpoint 3-D image by a timesharing operation with respect to the viewpoint controller 30'.

The light La of a left eye image collected by the lens array unit 50 may be focused at the first viewpoint V1 by the first reflection mirror devices 31. The light Lb of a right eye image collected by the lens array unit 50 may be focused at the second viewpoint V2 by the second reflection mirror devices 33. By altering the tilt angle of each of the reflection surfaces 31a and 31b of the first and second reflection mirror devices 31 and 33 by substantially the same degree, the locations of the first and second viewpoints V1 and V2 may be changed to a second location ② of FIG. 9B from a first location ① of FIG. 9A.

As such, when the tilt angles of the reflection surfaces 31a of the first reflection mirror devices 31 and the tilt angles of the reflection surfaces 33a of the second reflection mirror devices 33 are changed, the locations of the first and second viewpoints V1 and V2 may be sequentially changed from the first location ① o the second location ②, or any of other locations (for example, the third location ③ illustrated in FIG. 4C). That is, the control of the tilt angles of the reflection surfaces 31a and 33a of the first and second reflection mirror devices 31 and 33 may change the locations of the first and second viewpoints V1 and V2 in a timesharing manner.

Thus, a multi-viewpoint 3-D image may be formed in a timesharing manner. Since the multi-viewpoint is formed by timesharing and thus only one left eye image and one right eye image, corresponding to one 3-D image with two viewpoints, is formed at any given point in time, even if the number of viewpoints is greatly increased beyond two viewports, a resolution when a 3-D image is formed may be maintained at a constant value of half the resolution when a 2-D image is formed, regardless of the number of viewpoints. Since the number of viewpoints may be increased without reduction of a resolution of the 3-D image, a viewing zone may be expanded while maintaining a substantially constant 3-D image resolution.

Thus, when operating the 3-D image display apparatus as illustrated in FIG. 8, by controlling the tilt angle of each of the reflection surfaces 31a and 33a of the first and second reflection mirror devices 31 and 33, the locations of the first and second viewpoints V1 and V2 may changed at least twice, and thus a multi-viewpoint 3-D image may be formed in a timesharing manner.

Figure 10:
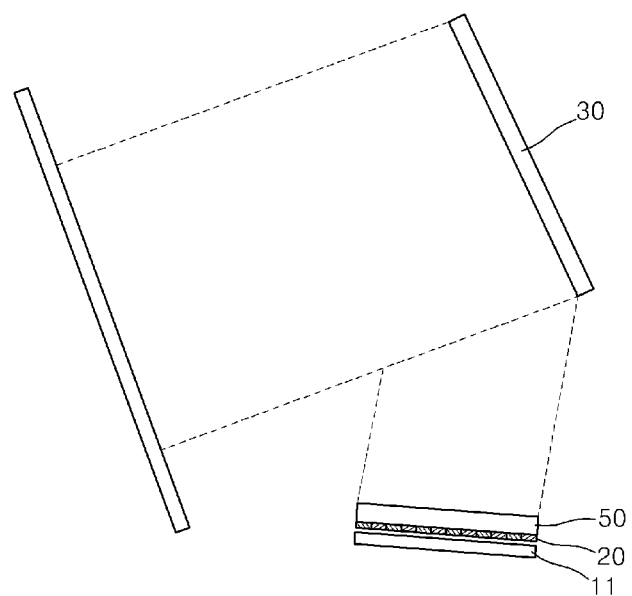
FIG. 10 is a diagram illustrating an example of a 2-D image mode operation state of the 3-D image display apparatus of FIG. 8.

The lens array unit 50 may be an active type lens array that separates a left eye image and a right eye image from each other in a 3-D image mode but does not operate as a lens array in a 2-D image mode. FIG. 10 illustrates an example of a 2-D image mode operating state of the 3-D image display apparatus of FIG. 8.

If the lens array unit 50 is an active type lens array and is in a state where it is not functioning as a lens, and if the reflection mirror device array of the viewpoint controller 30 is fixed without tilting so as to reflect light without altering a 2-D image formed by the display device 20, a 2-D image may be displayed as illustrated in FIG. 10. As such, when the lens array unit 50 is an active type lens array, the 3-D image display apparatus may switch between the 2-D image mode and the 3-D image mode.

FIGS. 11A, 11B, 12A, 12B, 13, and 14 illustrate other examples of 3-D image display apparatuses in which an image forming unit 100 is a projection type image forming unit and a reflection mirror type display panel is implemented as a display device. That is, the image forming unit 100 includes an illumination unit 110 and the reflection mirror type display panel. The reflection mirror type display panel is configured to form a left eye image and a right eye image by changing an angle of each of reflection mirrors that correspond to the first regions 21 and the second regions 23 of the transmission type display device 20 described herein. The angle of each reflection mirror may be changed in a digital or analog manner.

The illumination unit 110 may employ various structures that are well known in the fields of projectors and projection display devices. For example, as illustrated in FIGS. 11A-13, the illumination unit 110 may include a light source 111 such as a lamp or a light emitting diode for emitting white light, a color light forming unit 113 such as a color wheel or filter for extracting color light from white light emitted by the light source 111, and a lens unit 115 and a reflection mirror 117 for adjusting the size or divergence angle of a light beam. Also, as illustrated in FIG. 14, the illumination unit 110 may include a light source 111' for emitting collimated white light, the color light forming unit 113, for example, a color wheel or filter, and the reflection mirror 117; accordingly, the illumination unit 110 may emit collimated light. Since the illumination unit 110 of FIGS. 11A-14 is provided as an example, the present invention is not limited thereto and may be modified in various ways.

Figure 11A:
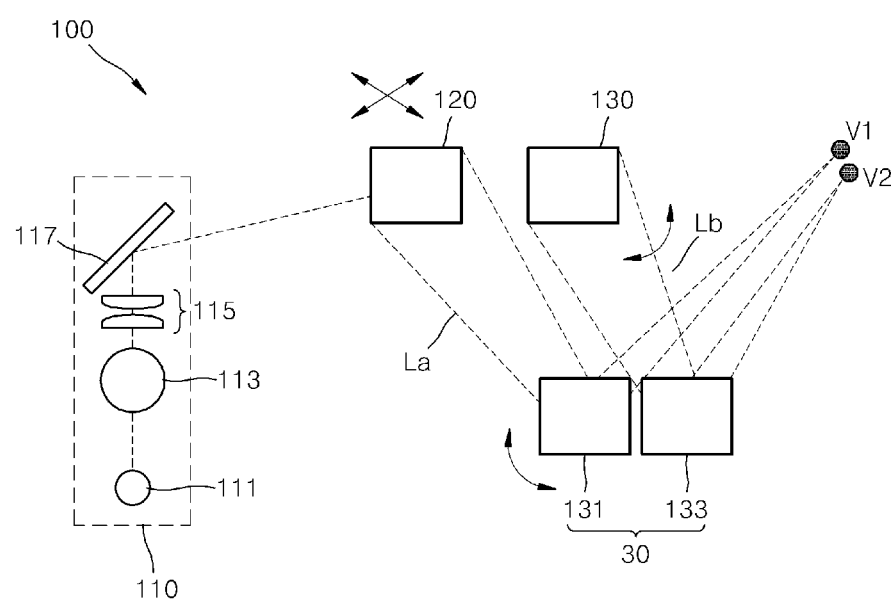
FIGS. 11A, 11B, 12A, 12B, 13, and 14 are diagrams illustrating other examples of 3-D image display apparatuses.
Figure 11B:
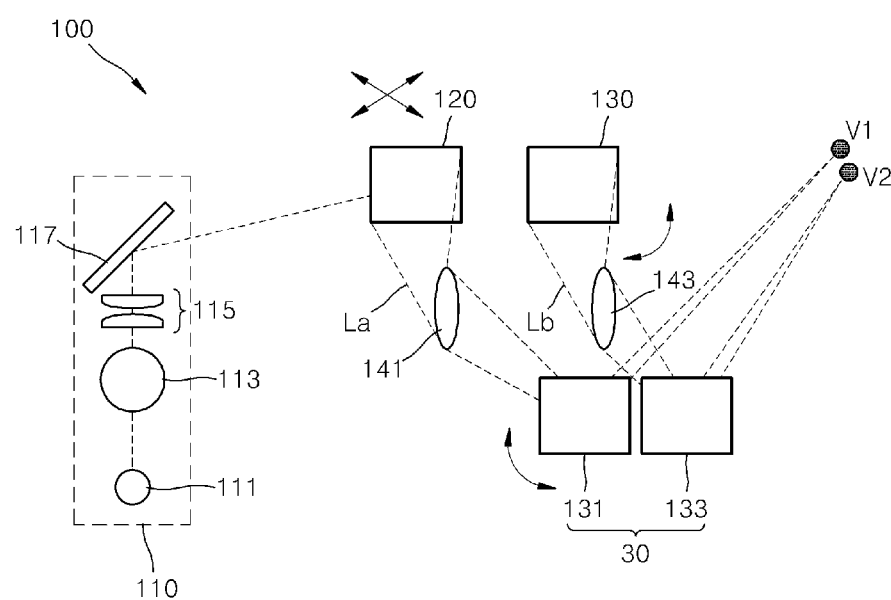

Referring to FIGS. 11A and 11B, the viewpoint controller 30 may be formed such that a first reflection mirror device 131 and a second reflection mirror device 133 are separated from each other. The reflection mirror type display panel may include a first reflection mirror type display panel 120 and a second reflection mirror type display panel 130, wherein the second reflection mirror type display panel 130 is separated from the first reflection mirror type display panel 120. The first reflection mirror type display panel 120 may include a plurality of first regions for forming a left eye image, and the second reflection mirror type display panel 130 may include a plurality of second regions for forming a right eye image. The first reflection mirror device 131 reflects the light La of a left eye image from the first reflection mirror type display panel 120 to collect the light La of a left eye image at the first viewpoint V1. The second reflection mirror device 133 reflects the light Lb of a right eye image from the second reflection mirror type display panel 130 to collect the light Lb of a right eye image at the second viewpoint V2.

As illustrated in FIG. 11A, if no lens is provided between the first reflection mirror type display panel 120 and the first reflection mirror device 131, or if no lens is provided between the second reflection mirror type display panel 130 and the second reflection mirror device 133, each of the first and the second reflection mirror devices 131 and 133 may include a reflection mirror array that corresponds to reflection mirror array structures of the first and second reflection mirror type display panels 120 and 130. Thus, the light La of a left eye image and the light Lb of a right eye image may be respectively collected at the first and second viewpoints V1 and V2.

As illustrated in FIG. 11B, a lens 141 may be provided between the first reflection mirror type display panel 120 and the first reflection mirror device 131, and a lens 143 may be provided between the second reflection mirror type display panel 130 and the second reflection mirror device 133. Accordingly, each of the first and second reflection mirror devices 131 and 133 may include a single reflection mirror structure to collect the light La of a left eye image from the first reflection mirror type display panel 120 and the light Lb of a right eye image from the second reflection mirror type display panel 130. Thus, the light La of the left eye image and the light Lb of the right eye image may be respectively collected at the first and second viewpoints V1 and V2 by the lenses 141 and 143. Here, each of the first and second reflection mirror devices 131 and 133 may be configured to include a reflection mirror array that corresponds to the reflection mirror array structures of the first and second reflection mirror type display panels 120 and 130.

Figure 12A:
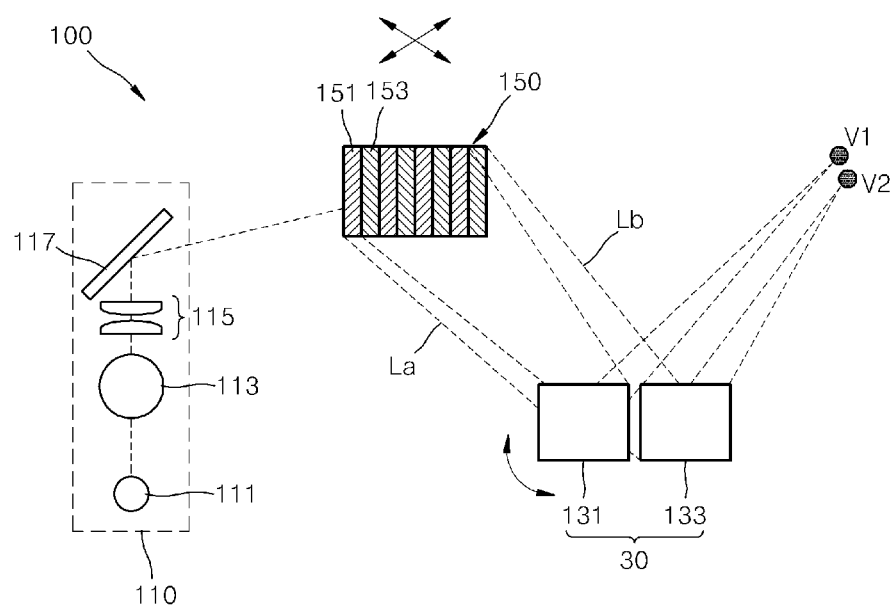
Figure 12B:
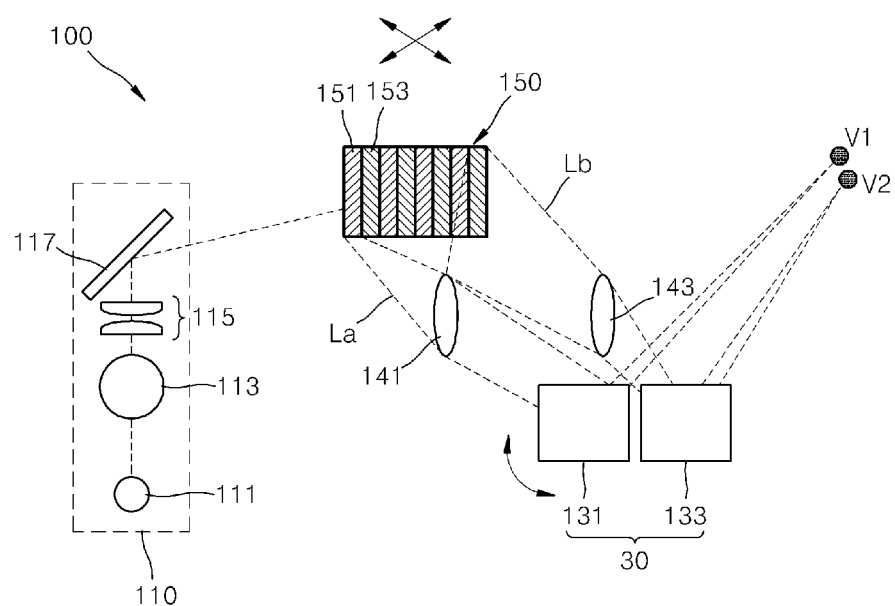

Referring to FIGS. 12A and 12B, the viewpoint controller 30 may be formed such that the first and second reflection mirror devices 131 and 133 are separated from each other. A reflection mirror type display panel 150 may include a single panel in which a plurality of first regions 151 for forming a left eye image and a plurality of second regions 153 for forming a right eye image are alternately arranged. The reflection mirror type display panel 150 may allow the light La of a left eye image and the light Lb of a right eye image to respectively proceed toward the first and second reflection mirror devices 131 and 133, and the first and second reflection mirror devices 131 and 133 may be separated from each other. The first reflection mirror device 131 reflects the light La of a left eye image from the first regions 151 of the reflection mirror type display panel 150 to collect the light La of a left eye image at the first viewpoint V1. The second reflection mirror device 133 reflects the light Lb of a right eye image from the second regions 153 of the reflection mirror type display panel 150 to collect the light Lb of a right eye image at the second viewpoint V2.

As illustrated in FIG. 12A, if no lens is provided between the reflection mirror type display panel 150 and the first reflection mirror device 131, or if no lens is provided between the reflection mirror type display panel 150 and the second reflection mirror device 133, each of the first and the second reflection mirror devices 131 and 133 may include a reflection mirror array that corresponds to reflection mirror array structures of the first and second regions 151 and 153 of the reflection mirror type display panel 150. Thus, the light La of a left eye image and the light Lb of a right eye image may be respectively collected at the first and second viewpoints V1 and V2.

As illustrated in FIG. 12B, the lens 141 may be provided between the reflection mirror type display panel 150 and the first reflection mirror device 131, and the lens 143 may be provided between the reflection mirror type display panel 150 and the second reflection mirror device 133. Accordingly, each of the first and second reflection mirror devices 131 and 133 may include a single reflection mirror structure to collect the light La of a left eye image from the first regions 151 of the reflection mirror type display panel 150 and the light Lb of a right eye image from the second regions 153 of the reflection mirror type display panel 150. Thus, the light La of the left eye image and the light Lb of the right eye image may be respectively collected at the first and second viewpoints V1 and V2 by the lenses 141 and 143.

Figure 13:
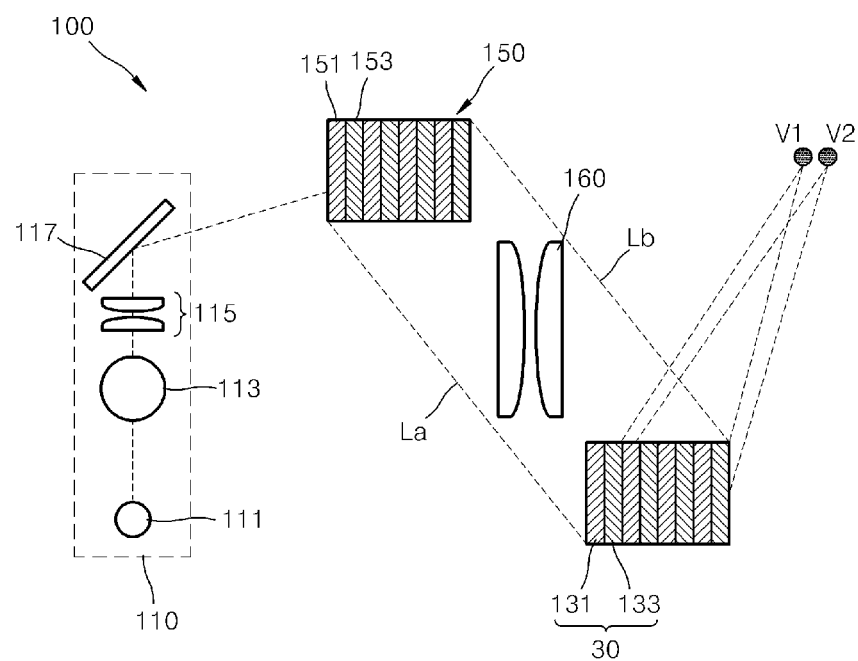
Figure 14:
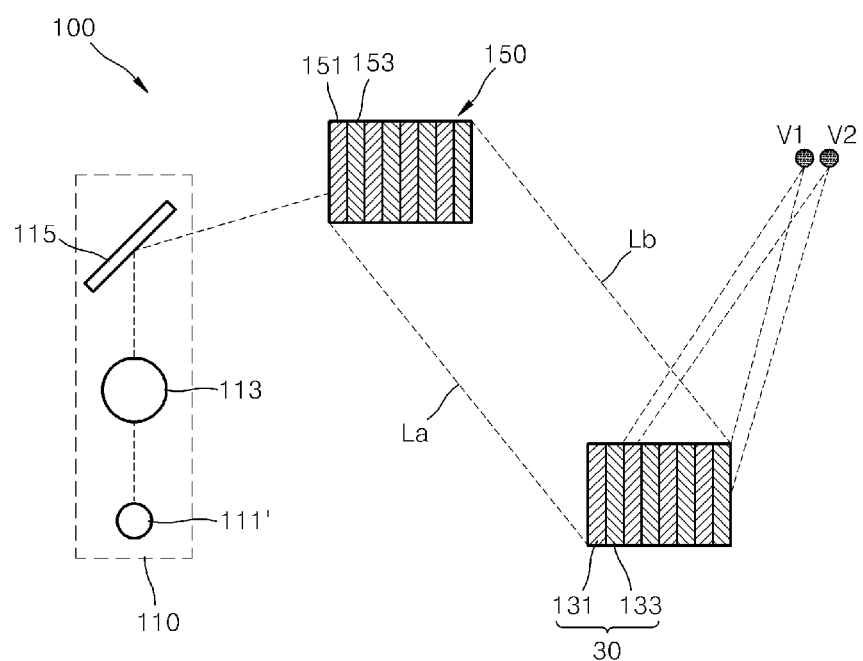

Referring to FIGS. 13 and 14, the reflection mirror type display panel 150 may include a single panel in which the plurality of first regions 151 for forming a left eye image and the plurality of second regions 153 for forming a right eye image are alternately arranged. The reflection mirror type display panel 150 may allow the light La of a left eye image and the light Lb of a right eye image to respectively proceed toward the first and second reflection mirror devices 131 and 133 of the viewpoint controller 30. The viewpoint controller 30 may be formed as a single panel in which the first and second reflection mirror devices 131 and 133 are alternately arranged to correspond to the single panel structure of the reflection mirror type display panel 150. The first reflection mirror device 131 reflects the light La of a left eye image from the reflection mirror type display panel 150 to collect the light La of a left eye image at the first viewpoint V1. The second reflection mirror device 133 reflects the light Lb of a right eye image from the reflection mirror type display panel 150 to collect the light Lb of a right eye image at the second viewpoint V2.

Referring to FIG. 13, a lens unit 160 may be provided between the reflection mirror type display panel 150 and the first and second reflection mirror devices 131 and 133. Accordingly, the light La of a left eye image and the light Lb of a right eye image may be respectively reflected from the reflection mirror type display panel 150 to the first and second reflection mirror devices 131 and 133 in a one-to-one correspondence, due to the alternating arrangements of both the viewpoint controller 30 and the reflection mirror type display panel 150.

Referring to FIG. 14, since the illumination unit 110 emits collimated light as described above, the light La of a left eye image and the light Lb of a right eye image reflected from the alternating first and second regions 151 and 153 of the reflection mirror type display panel 150 may be respectively incident at the first and second reflection mirror devices 131 and 133, which are alternately arranged, in a one-to-one correspondence. Thus, as illustrated in FIG. 14, an image forming unit 100 may be provided without the lens unit 160 of FIG. 13 between the reflection mirror type display panel 150 and the first and second reflection mirror devices 131 and 133.

As described above, according to the one or more of the above examples, since only one left eye image and one right eye image corresponding to one 3-D image having two view points is formed at any point in time, if the number of viewpoints is increased beyond two, a resolution of the image observed by a viewer may be maintained relatively constant regardless of the number of viewpoints. Thus, when a 3-D image is to be formed, a 3-D image display apparatus capable of expanding a viewing zone while substantially maintaining resolution may be provided.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A 3-D image display apparatus comprising:
    an image forming unit comprising a display device that includes a plurality of first regions for forming a first image and a plurality of second regions for forming a second image; and
    a viewpoint controller comprising first and second reflection mirror devices for reflecting light of the first image to a first viewpoint and light of the second image to a second viewpoint, and for changing locations of the first and second viewpoints by controlling an angle of reflection surfaces of the first and second reflection mirror devices,
    wherein the first image and the second image are formed according to image information.

2. The 3-D image display apparatus of claim 1, wherein, to separate the light of the first image and the light of the second image formed by the display device and to collect the separated first and second lights at the first and second viewpoints in a 3-D image mode,
    the number of the first reflection mirror devices corresponds to the number of the first regions, and the angle of each reflection surface of the first reflection mirror devices is set to reflect the light of the first image from the first regions to collect the light of the first image at the first viewpoint,
    the number of the second reflection mirror devices corresponds to the number of the second regions, and the angle of each reflection surface of the first reflection mirror devices is set to reflect the light of the second image from the second regions to collect the light of the second image at the second viewpoint, and
    the angles of the reflection surfaces of the first and second reflection mirror devices are controlled to change the locations of the first and second viewpoints at least twice so that a 3-D image is formed at a plurality of viewpoints.

3. The 3-D image display apparatus of claim 2, wherein the reflection surfaces of the first and second reflection mirror devices are controllable to switch between a 2-D image mode and the 3-D image mode, and in the 2-D image mode the reflection surfaces of the first and second reflection mirror devices are fixed at substantially the same angle.

4. The 3-D image display apparatus of claim 2, wherein at least two of each of the first and second reflection mirror devices are controlled to have different angles.

5. The 3-D image display apparatus of claim 4, wherein, when the locations of the first and second viewpoints are changed to any of other locations, the angle of each of the reflection surfaces of the first and second reflection mirror devices is changed by substantially the same degree.

6. The 3-D image display apparatus of claim 4, wherein the reflection surfaces of the first and second reflection mirror devices are controllable to switch between the 2-D image mode and the 3-D image mode, and in the 2-D image mode the reflection surfaces of the first and second reflection mirror devices are fixed at substantially the same angle.

7. The 3-D image display apparatus of claim 1, wherein the image forming unit further comprises a lens array unit for separating the light of the first image and the light of the second image and for collecting the separated first and second lights at the first and second viewpoints in a 3-D image mode,
    the first and second reflection mirror devices reflect the light of the first image and the light of the second image, separated by the lens array unit, toward the first and second viewpoints in the 3-D image mode, and
    the locations of the first and second viewpoints are changed at least twice by controlling the angle of each of the reflection surfaces of the first and second reflection mirror devices, to form a 3-D image at a plurality of viewpoints.

8. The 3-D image display apparatus of claim 7, wherein each of the first and second reflection mirror devices comprises a single reflection mirror device or a plurality of reflection mirror devices in a 2-D array, and when the locations of the first and second viewpoints are changed to any of other locations, the angle of each of the reflection surfaces of the first and second reflection mirror devices is changed by substantially the same degree.

9. The 3-D image display apparatus of claim 7, wherein the lens array unit is an active type lens array unit that separates the first image and the second image in the 3-D image mode, but does not operate as a lens in a 2-D image mode, and is controllable to switch between the 2-D image mode and the 3-D image mode.

10. The 3-D image display apparatus of claim 1, wherein the first and second reflection mirror devices each control the angles of the reflection surfaces in an analog manner.

11. The 3-D image display apparatus of claim 1, wherein the first regions for forming the first image and the second regions for forming the second image are alternately arranged, and the first and second reflection mirror devices are alternately arranged to correspond to the first and second regions.

12. The 3-D image display apparatus of claim 1, wherein the first regions are located at one side of the display device, the second regions are located at another side of the display device, and the first and second reflection mirror devices are arranged to correspond to the first and second regions.

13. The 3-D image display apparatus of claim 12, wherein the first and second reflection mirror devices each control the angles of the reflection surfaces in an analog manner.

14. The 3-D image display apparatus of claim 1, wherein the image forming unit further comprises a surface light source, and the display device of the image forming unit comprises a flat type display device that modulates light emitted by the surface light source according to the image information.

15. The 3-D image display apparatus of claim 1, wherein the display device comprises a reflection mirror type display panel.

16. The 3-D image display apparatus of claim 15, wherein the reflection mirror type display panel forms the first image and the second image by changing an angle of a reflection surface of a reflection mirror corresponding to the first and second regions.

17. The 3-D image display apparatus of claim 16, wherein
the reflection type display panel comprises a first reflection mirror type display panel that includes the first regions and a second reflection mirror type display panel that includes the second regions, wherein the second reflection mirror type display panel is separated from the first reflection mirror type display panel,
the first reflection mirror device reflects the light of the first image incident thereon from the first reflection mirror type display panel, to collect the light of the first image at the first viewpoint, and
the second reflection mirror device reflects the light of the second image incident thereon from the second reflection mirror type display panel, to collect the light of the second image at the second viewpoint.

18. The 3-D image display apparatus of claim 16, wherein
the reflection mirror type display panel comprises a single panel that includes the first and second regions to emit the light of the first image and the light of the second image toward the first and second reflection mirror devices, wherein the light of the first image and the light of the second image are separated from each other,
the first reflection mirror device reflects the light of the first image from the reflection mirror type display panel to collect the light of the first image at the first viewpoint, and
the second reflection mirror device reflects the light of the second image from the reflection mirror type display panel to collect the light of the second image at the second viewpoint.

19. The 3-D image display apparatus of claim 16, wherein the reflection mirror type display panel comprises a single panel in which the first and second regions are alternately arranged to emit the light of the first image and the light of the second image toward the first and second reflection mirror devices,
the first and second reflection devices comprise single panels that are alternately arranged, such that each of the single panels of the first and second reflection devices corresponds to one of the single panels of the reflection mirror type display panel,
the first reflection mirror device reflects the light of the first image from the reflection mirror type display panel to collect the light of the first image at the first viewpoint, and
the second reflection mirror device reflects the light of the second image from the reflection mirror type display panel to collect the light of the second image at the second viewpoint.

20. The 3-D image display apparatus of claim 1, wherein the display device comprises a reflection mirror type display panel,
the reflection mirror type display panel forms the first image and the second image by changing an angle of a reflection surface of a reflection mirror corresponding to the first and second regions,
the first and second reflection mirror devices are separated from each other,
the reflection mirror type display panel comprises a single panel in which the first and second regions are alternately arranged, or comprises a structure in which a panel that includes the first regions is separated from a panel that includes the second regions, and emits the light of the first image and the light of the second image toward the first and second reflection mirror devices,
a first lens for collecting the light of the first image is disposed between the reflection mirror type display panel and the first reflection mirror device,
a second lens for collecting the light of the second image is disposed between the reflection mirror type display panel and the second reflection mirror device,
the first reflection mirror device reflects the light of the first image collected by the first lens toward the first viewpoint,
the second reflection mirror device reflects the light of the second image collected by the second lens toward the second viewpoint, and
the first and second reflection mirror devices change the locations of the first and second viewpoints at least twice by controlling the angle of reflection surfaces of the first and second reflection mirror devices, to form a 3-D image at a plurality of viewpoints.

21. A method of displaying a 3-D image or a 2-D image, the method comprising:
forming a first image and a second image according to image information,
emitting light of the first image to one or more first reflecting devices,
emitting light of the second image to one or more second reflecting devices,
reflecting the light of the first image in a first emission direction, and
reflecting the light of the second image in a second emission direction,
wherein the first emission direction and the second emission direction are selectively controlled to provide a 3-D image or a 2-D image for at least one user.

22. The method of claim 21, wherein the 3-D image is provided when the first image emission direction is directed to a first left eye location of the at least one user and the second image emission direction is directed to a first right eye location of the at least one user.

23. The method of claim 22, wherein another 3-D image is provided when the first image emission direction is directed to a second left eye location of another at least one user and the second image emission direction is directed to a second right eye location of the another at least one user.

24. The method of claim 21, wherein the 2-D image is provided when the first emission direction is substantially parallel to the second image direction.

* * * * *